United States Patent
Hess et al.

(10) Patent No.: US 9,845,907 B2
(45) Date of Patent: Dec. 19, 2017

(54) PLUG CONNECTION FOR FLUID LINES AND RETAINING PART FOR SUCH A PLUG CONNECTION

(71) Applicant: Voss Automotive GmbH, Wipperfürth (DE)

(72) Inventors: Jochem-Andreas Hess, Wipperfürth (DE); Günter Sieper, Remscheid (DE); Reinhard Plietsch, Wermelskirchen (DE); Frank Zenses, Hürth (DE)

(73) Assignee: VOSS Automotive GmbH, Wipperfurth (DE)

( * ) Notice: Subject to any disclaimer, the term of this patent is extended or adjusted under 35 U.S.C. 154(b) by 824 days.

(21) Appl. No.: 13/929,934

(22) Filed: Jun. 28, 2013

(65) Prior Publication Data

US 2014/0210202 A1    Jul. 31, 2014

Related U.S. Application Data

(60) Provisional application No. 61/756,606, filed on Jan. 25, 2013.

(51) Int. Cl.
  *F16L 23/04* (2006.01)
  *F16L 37/12* (2006.01)

(52) U.S. Cl.
  CPC ........... *F16L 37/1225* (2013.01); *F16L 23/04* (2013.01)

(58) Field of Classification Search
  CPC .............................. F16L 23/04; F16L 37/1225
  USPC ................. 285/305, 321, 374, 369, 417–419
  See application file for complete search history.

(56) References Cited

U.S. PATENT DOCUMENTS

| | | | |
|---|---|---|---|
| 2,144,035 A | | 1/1939 | Smith, Jr. |
| 3,479,069 A | * | 11/1969 | Sedam ................ F16L 37/1225 285/364 |
| 3,930,674 A | | 1/1976 | Jonsson |
| 6,375,416 B1 | | 4/2002 | Farrell et al. |
| 7,909,369 B2 | * | 3/2011 | Kertesz ............... F16L 37/0985 285/242 |
| 9,383,050 B1 | * | 7/2016 | Home ................. F16L 37/1225 |

(Continued)

FOREIGN PATENT DOCUMENTS

| | | |
|---|---|---|
| DE | 4217646 C1 | 9/1993 |
| DE | 200001019 U1 | 6/2001 |

(Continued)

*Primary Examiner* — David E Bochna
(74) *Attorney, Agent, or Firm* — Eric J. Sosenko; Jonathan P. O'Brien; Honigman Miller Schwartz and Cohn LLP

(57) ABSTRACT

A plug connection (1) for fluid lines, with two intermateable coupling parts (2, 3), which in an inserted state can be releasably locked via a locking device (4) consisting of two outer radial flange-like retaining ribs (21, 31) of the two coupling parts (2, 3), which are adjacent in an insertion direction (S) and axial (X-X) in inserted state and a retaining part (5) with an annular contour, which in preassembled state can be axially and radially fixed and undetachably assembled on one of the two coupling parts (3) and in an assembled state axially and radially encompasses the retaining ribs (21, 31) of the two coupling parts with at least one radially elastically moving retaining section (53) with a C-shaped axial section having two collars (51, 52). The plug connection incorporates features to ensure the undetachability of the retaining part (5) and minimize the space requirement, in particular during disassembly.

17 Claims, 12 Drawing Sheets

(56) References Cited

U.S. PATENT DOCUMENTS

| | | | | |
|---|---|---|---|---|
| 2001/0022448 A1* | 9/2001 | Matsuzawa | ............. | F16L 23/08 |
| | | | | 285/367 |
| 2006/0022467 A1* | 2/2006 | Yamamoto | .......... | F16L 37/1225 |
| | | | | 285/420 |
| 2006/0049630 A1* | 3/2006 | Bilstein | ............... | F16L 37/1225 |
| | | | | 285/321 |
| 2008/0314381 A1* | 12/2008 | Garraffa | ................ | B63C 11/205 |
| | | | | 128/201.11 |

FOREIGN PATENT DOCUMENTS

| | | | | |
|---|---|---|---|---|
| DE | 102005038439 A1 | | 2/2006 | |
| DE | 102012104288 A1 | * | 11/2013 | .......... F16L 37/1225 |
| EP | 0 651 207 A1 | | 5/1995 | |
| EP | WO 2006/018384 A1 | | 2/2006 | |
| EP | WO 2009/156399 A1 | | 12/2009 | |
| FR | 2 816 361 | | 5/2002 | |
| GB | WO 2010/046668 A1 | | 4/2010 | |

* cited by examiner

PLUG CONNECTION FOR FLUID LINES AND RETAINING PART FOR SUCH A PLUG CONNECTION

CROSS-REFERENCE TO RELATED APPLICATIONS

This application claims priority to U.S. Provisional Application Ser. No. 61/756,606, filed Jan. 25, 2013.

FIELD OF THE INVENTION

The present invention relates to a plug connection for fluid lines comprising two intermateable coupling parts, which can be releasably locked via a locking device in an inserted state, consisting, on the one hand, of two external radial flange-like retaining ribs of the two coupling parts, which are adjacent in the insertion direction when inserted, and, on the other hand, of a retaining part having an annular contour, which is axially and radially undetachably fixed on one of the two coupling parts in a preassembled state and axially and radially encompasses the retaining ribs in the assembled state with at least one radially elastically movable retaining section, which forms two collars.

The present invention further relates to a retaining part for such a plug connection.

BACKGROUND OF THE INVENTION

A plug connection of the aforementioned kind is known from WO 2006/018384 A1, which is based on a known locking principle, according to which a C-shaped retaining section of a retaining part encases and thus fixes retaining ribs of coupling parts in a positively locking manner. The retaining part is configured and is or can be undetachably preassembled in such a way that it is axially fixed with very little play and radially securely fixed, on the one hand, and can be elastically radially moved, on the other hand, in order to reduce the danger of loss of the retaining part and simplify an assembly, in particular also in applications in which only a small surrounding space is available at the assembly location, or in which at least one valve is to be integrated in the coupling parts. The retaining part in the area of the retaining section as well as the retaining rib of the other coupling part must be configured in adaptation to each other in order to form a positive snap-on connection acting in the insertion direction, in such a way that the retaining section is moved radially outwardly by the retaining rib moving relative thereto when the coupling parts of the retaining section are plugged into each other and subsequently encompasses the retaining rods of the two coupling parts for locking purposes by means of the radial return movement toward the inside in the inserted state. The retaining part is preferably configured as a one-piece annular part having an axially and radially continuous slot interruption at one point of the periphery. This known plug connection makes possible an easy, fast and convenient as well as also secure single-hand assembly. In order to reduce the danger of detachment when the retaining part is detached from the coupling parts, WO 2006/018384 provides to undetachably connect the retaining part to a coupling part via an additional, in particular ribbon-like or string-like locking element attachable at one end to the coupling part and at the other end to the retaining part.

A plug connection of a similar kind as the one initially described is known from WO 2009/156399 A1. In this document, the additional locking element is considered disadvantageous. In order to facilitate a positioning of the retaining part and the reassembly with low danger of detachment of the retaining part and with reduced complexity, while eliminating such an additional locking element, the retaining part is provided with a ring-shaped configuration, wherein the retaining part is fixed on at least one of the two coupling parts with a circumferentially closed annular contour in a preassembled state and encompasses at least one of the two coupling parts in the assembled state. The retaining part in this case can be preferably undetachably preassembled on a plug part, wherein it can be fixed in two positions, the preassembly position and the assembly position. It arrives from the preassembly position into the assembly position by means of a radial displacement or for disassembly from the assembly position back into the original position by means of a mutually opposite displacement. A particularly preferred configuration herein has an annular opening enclosed by the annular contour and is formed by a first circular partial opening with a central point in the area of the retaining section and a second circular partial opening, whose central point is located within a retaining section of the retaining part, wherein the two partial openings intersect. The retaining part has necessarily an enlarged radial extension, which is considered particularly disadvantageous when only very little installation space is available.

It is an object of the invention to improve a plug connection of the initially mentioned kind as well as a retaining part for such a plug connection in such a way that the assembly and disassembly can be further simplified, while retaining the advantages of the known locking principle, and namely also in applications in which only a very small surrounding space is available at the installation location in particular for the disassembly, wherein a low danger of detachment of the retaining part is to be ensured.

According to the invention, this is achieved for the plug connection and the retaining part by configuring the collars of the retaining part with different size and/or shape in such a way that a collar, which abuts against the retaining rib of one coupling part in assembled state, releases this retaining rib of the coupling part out of the assembled state with an outward radially elastic movement of the retaining section, while the other collar still engages at least in some areas behind the retaining rib of the other coupling part against which it abuts.

The advantages of the known generic locking principle are combined, on the one hand, with the advantages of a snap-fit principle in the plug connection according to the invention. If the retaining part is undetachably preassembled on the one coupling part, the other coupling part only needs to be axially inserted for assembly, which makes possible a simple, fast, easy to operate and secure automated or single-hand assembly. There is no need, on the other hand, to carry out a highly space-consuming radial displacement for disassembly of the retaining part in the embodiment according to the invention when the connection is disengaged, which is of particular advantage at installation locations with only small surrounding space in radial direction. One particular advantage is the possibility for single-finger unlocking.

A radial expansion, which again suffices to axially draw a coupling part out of the connection, can preferably be produced at the retaining part according to the invention by actuating or pressing the pressure-loaded area in an—especially elastic—actuating area of the retaining element located circumferentially between two retaining sections. One of the two collars of the retaining section, which additionally engages behind the retaining rib of the other coupling part against which it abuts in assembled state, remains axially fixed in an annular groove of the coupling part, whereby the retaining part is further retained on this coupling part.

A comparable technical solution for a plug connection similar to that of the above-mentioned type has also already been proposed in the German patent application DE 10 2012 104 288.8, in which however the retaining part does not have an open, but a circumferentially closed annular contour. In this previously proposed technical solution, it can be particularly provided that one of the two collars of the retaining part is provided with a socket-like circumferentially running, preferably additionally radially inwardly curved attachment, by means of which it differs in size and shape from the other collar and by which it protrudes—seen in axial projection—with respect to the other collar. Aside from this attachment, both collars are otherwise preferably configured identically, in particular—seen in plan view—preferably congruent. While the radial expansion, which can be produced, for example, also by means of pulling or levering with a tool in the actuation area, takes place in connection with an integral deformation of the entire retaining part, only a spreading of the retaining sections with respect to each other takes place according to the invention as a result of the annular contour, so that a detachment of the retaining part from the coupling part on which it is supposed to remain can be even more securely prevented.

The distance of the actuating section to the longitudinal axis of the coupling parts or also the distance to the collars of the coupling parts, in particular to an outer edge of the collar of a coupling part configured as a plug part, can advantageously be configured smaller than was proposed by the earlier technical solution by means of the expansion mechanism of the spreading. This is important insofar as the distance of the actuating section to the collars of the coupling parts represents the actuation path for release of the connection and determines the size of the installation space of the plug connection.

The open annular contour of the retaining part can be formed in particular in that the retaining part is provided with a slot on the side located diametrically opposite to the actuating area.

In contrast to the relatively large slot interruption, such as the one provided on the retaining part with a plug connection of the kind known from WO 2006/018384 A1, this slot is characteristically only very small. It can preferably have a size than can be preferably specified—with reference to a longitudinal axis of the retaining part—by means of an angle at center that is smaller than 15°, preferably smaller than 5°.

According to the invention, the two collars of the retaining part are preferably configured identically only in some areas—seen in plan view—and are especially preferably not congruent. They can especially have different wrap angles—with indeed approximately the same width and thoroughly identical circumferential, in particular circular arched curvature—for the coupling part located between them and for this reason a different circumferential length.

Other advantageous embodiment features of the invention are included in the following description.

BRIEF DESCRIPTION OF THE DRAWINGS

The invention will be described in more detail with reference to several preferred exemplary embodiments depicted in the drawings, wherein.

DETAILED DESCRIPTION OF THE INVENTION

Figure 1:
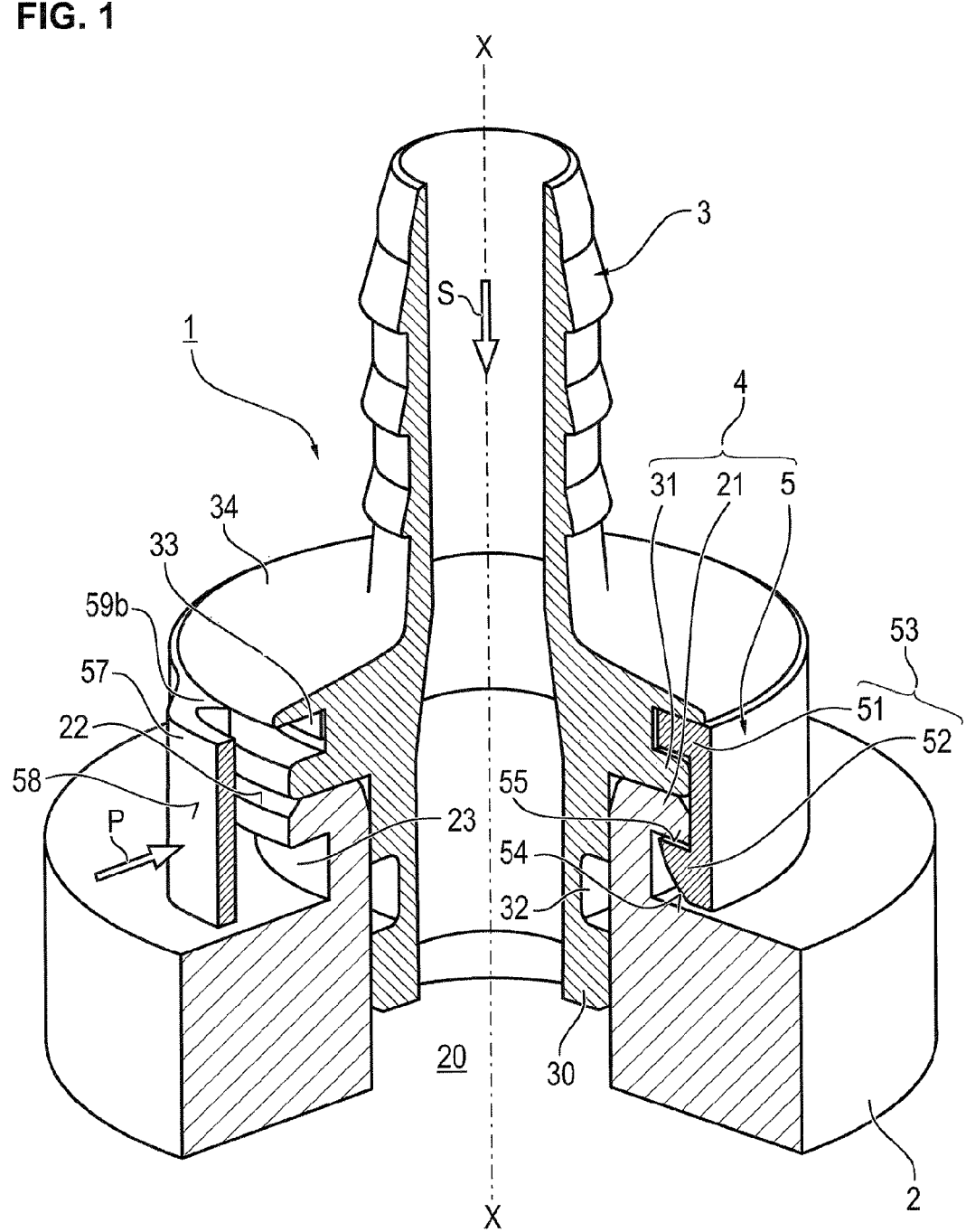
FIG. 1 shows a perspective view in partial section of a first embodiment of a plug connection according to the invention with a first embodiment of a retaining part according to the invention with inserted and locked state of the coupling parts, wherein the sectional plane runs in part through a longitudinal axis and in part through a transversal axis, as is characterized in FIG. 2 by means of the reference character I-I.

It is expressly emphasized with regard to the following description that the invention is not limited to the exemplary embodiments and at the same time also not to all or several of the features of the described feature combinations, but rather each individual partial feature of each exemplary embodiment can also be of inventive importance per se and also in combination with any of the features of another exemplary embodiment separately from all other partial features described in connection therewith.

The same parts are always provided with the same reference characters in the different figures of the drawings and for this reason, as a rule, need only to be described once.

A plug connection 1 according to the invention, which can be used especially for connecting fluid lines, comprises two intermateable coupling parts 2, 3, which are inserted into each other in the assembled state represented in FIG. 1 and can be coaxially detachably locked in this state via a locking device 4. The two intermateable coupling parts 2, 3 are in particular a socket part 2 and a plug part 3, which can be axially inserted (axis X-X) in a sealing manner into a receiving opening 20 of the socket part 2 with a plug shaft 30 and is retained there in inserted state by means of the locking device 4. The two coupling parts 2, 3 can both be preferably made of plastic.

The locking device 4 consists, on the one hand, of two outer radial flange-like retaining rib ribs 21, 31 of the two coupling parts 2, 3, which are axial in the inserted state and adjacent in the insertion direction (arrow S) and, on the other hand, of a retaining part 5. The retaining part 5 can also be advantageously configured as a plastic molded part, in particular for use with low fluid pressures, in which, for example, a thermoplastic elastomer material can also be used.

To seal the plug connection 1 an annular groove 32 can be provided, into which a peripheral seal (which is not depicted), in particular in the form of a sealing ring or O-ring, can be introduced preferably at the plug shaft 30.

Figure 7:
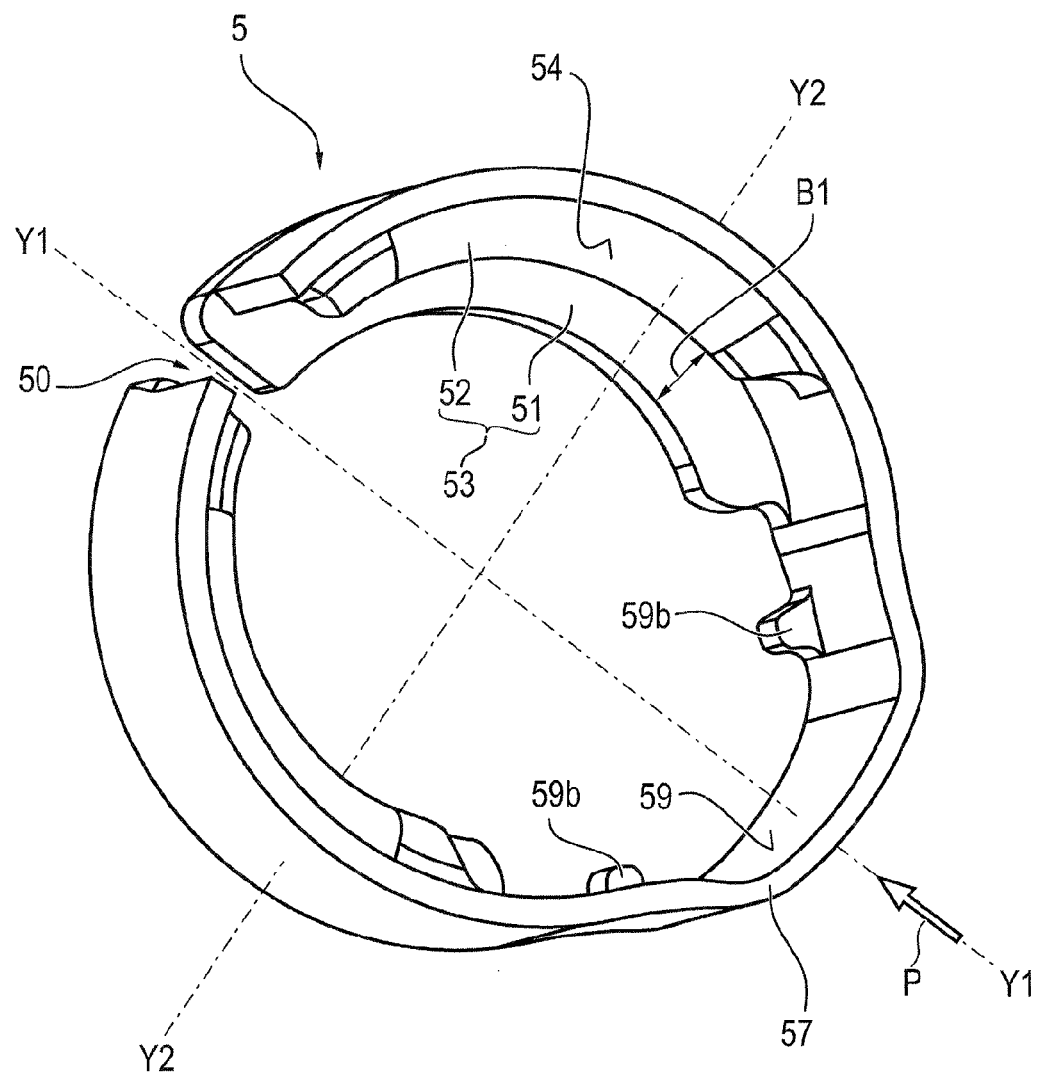
FIGS. 7 and 8 show perspective views of the first embodiment of the retaining part according to the invention seen from below from respectively different visual angles.
Figure 8:
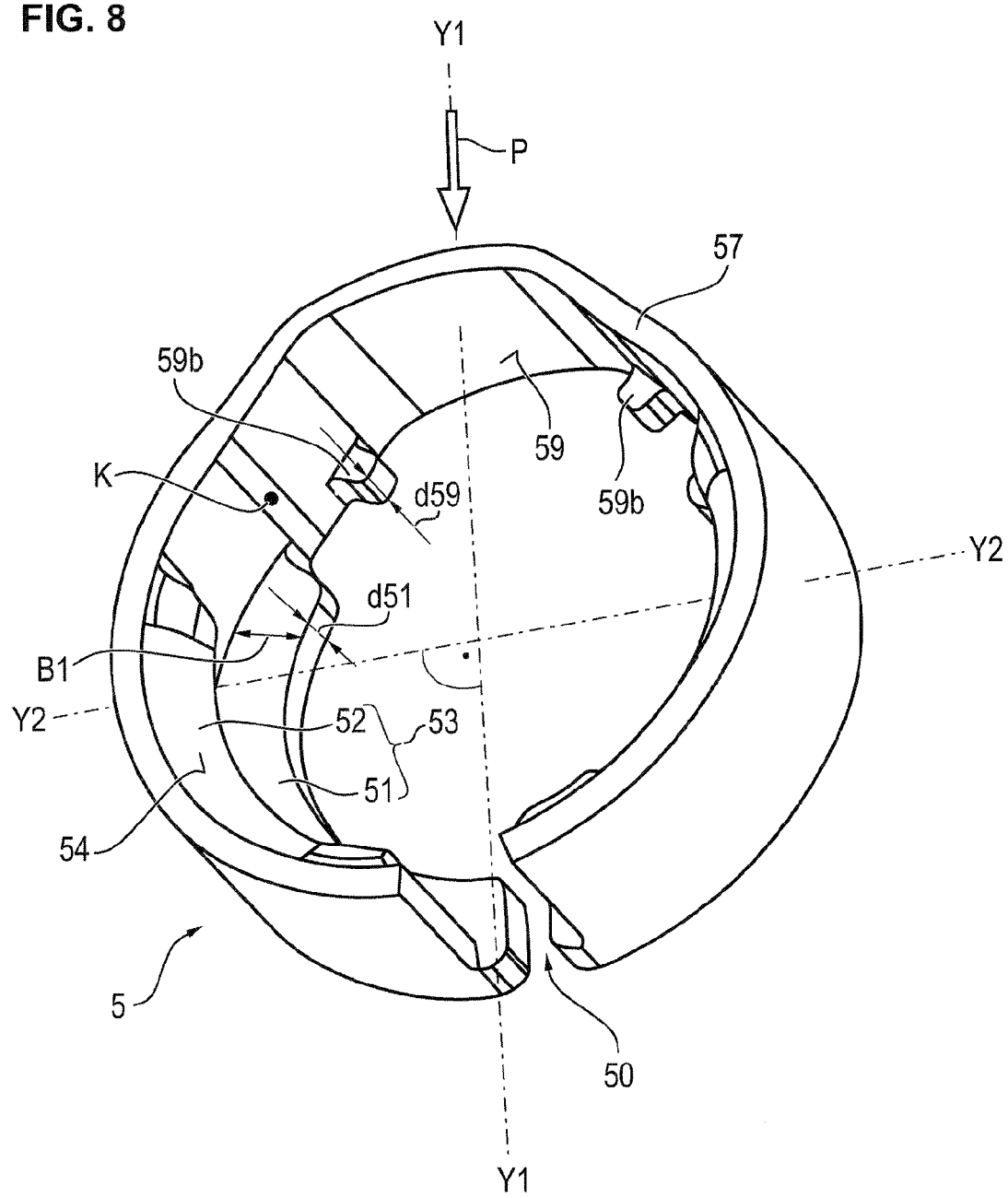
Figure 9:
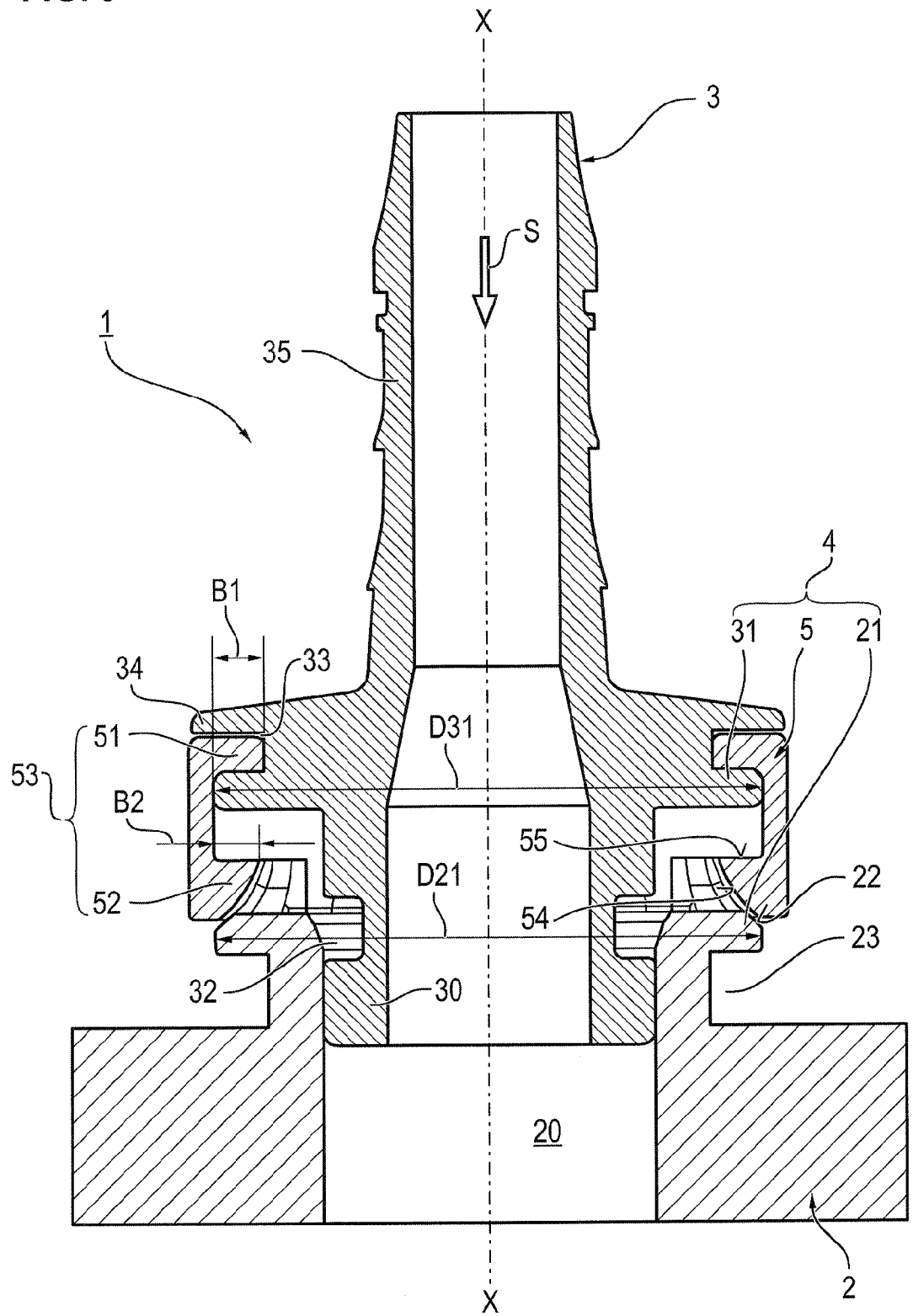
FIG. 9 shows an axial sectional view of the plug connection shown in FIG. 1 during assembly, wherein the retaining part according to the invention is in preassembly state on a coupling part.
Figure 10:
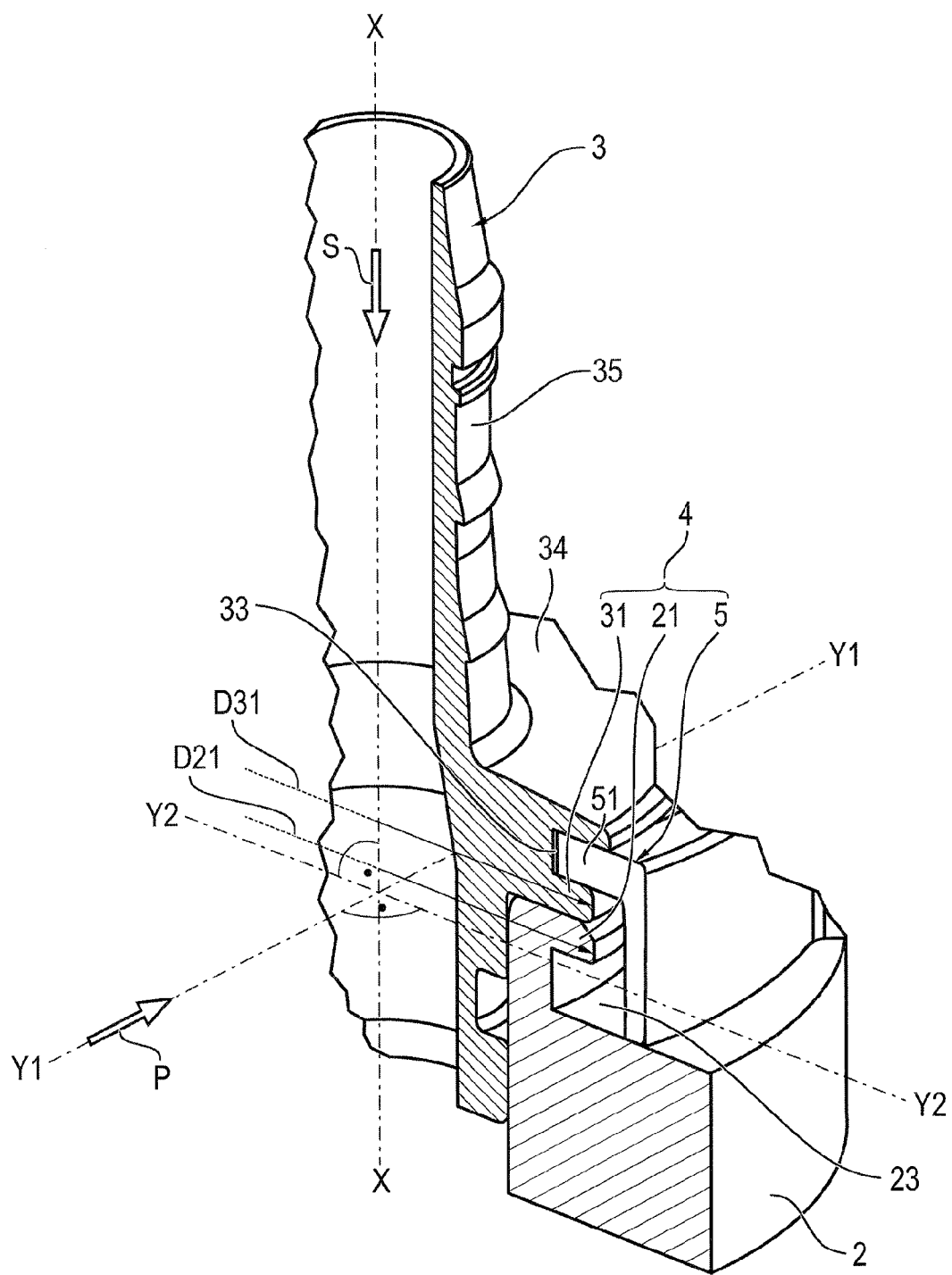
FIG. 10 shows a partial sectional perspective view of the first embodiment of a plug connection according to the invention with the first embodiment of a retaining part according to the invention during disassembly, wherein the sectional plane runs along the transversal axis Y2-Y2.
Figure 11:
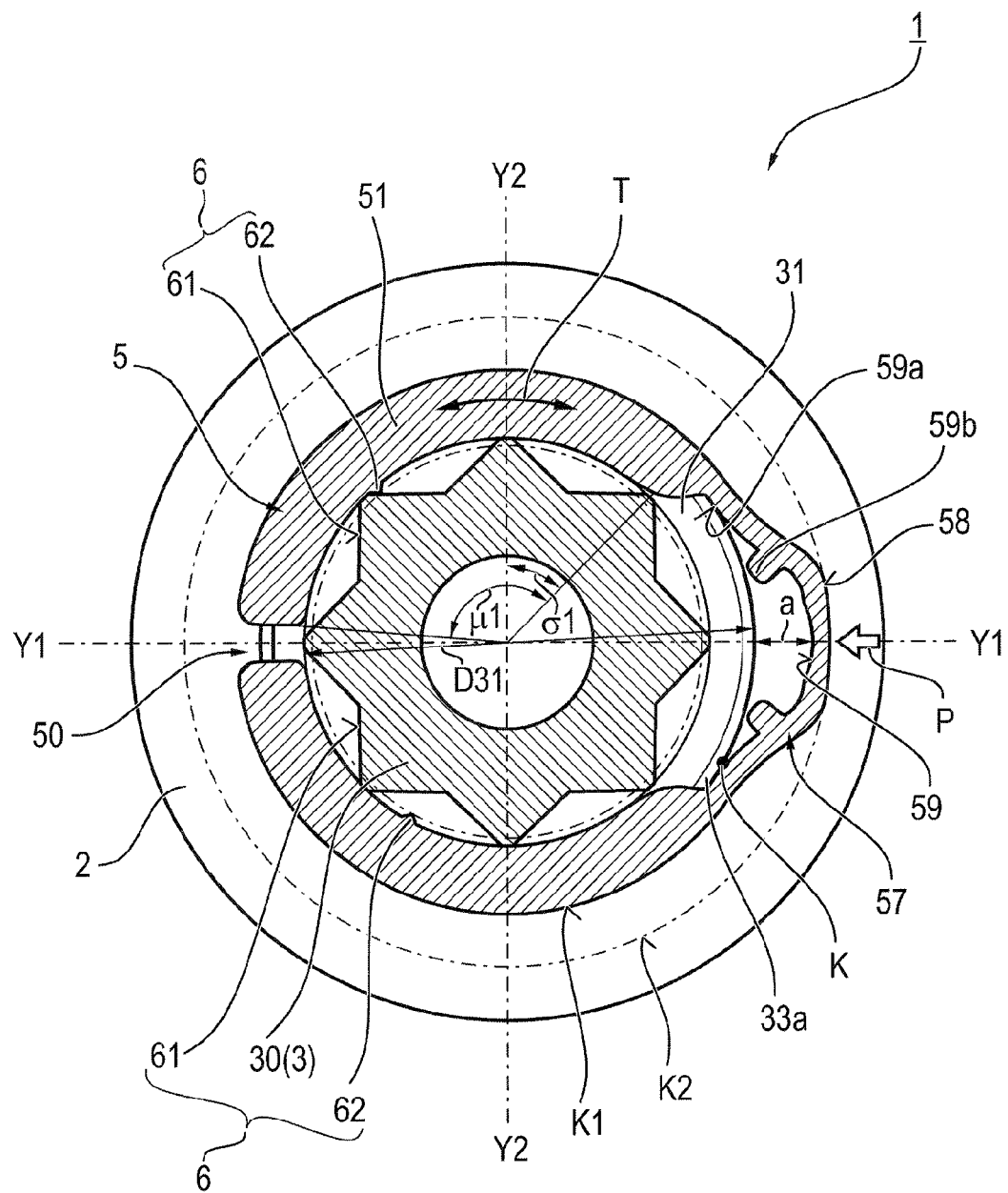
FIG. 11 shows a section through a second embodiment of a plug connection according to the invention with a second embodiment of a retaining part according to the invention in a representation according to FIG. 3, but enlarged.
Figure 12:
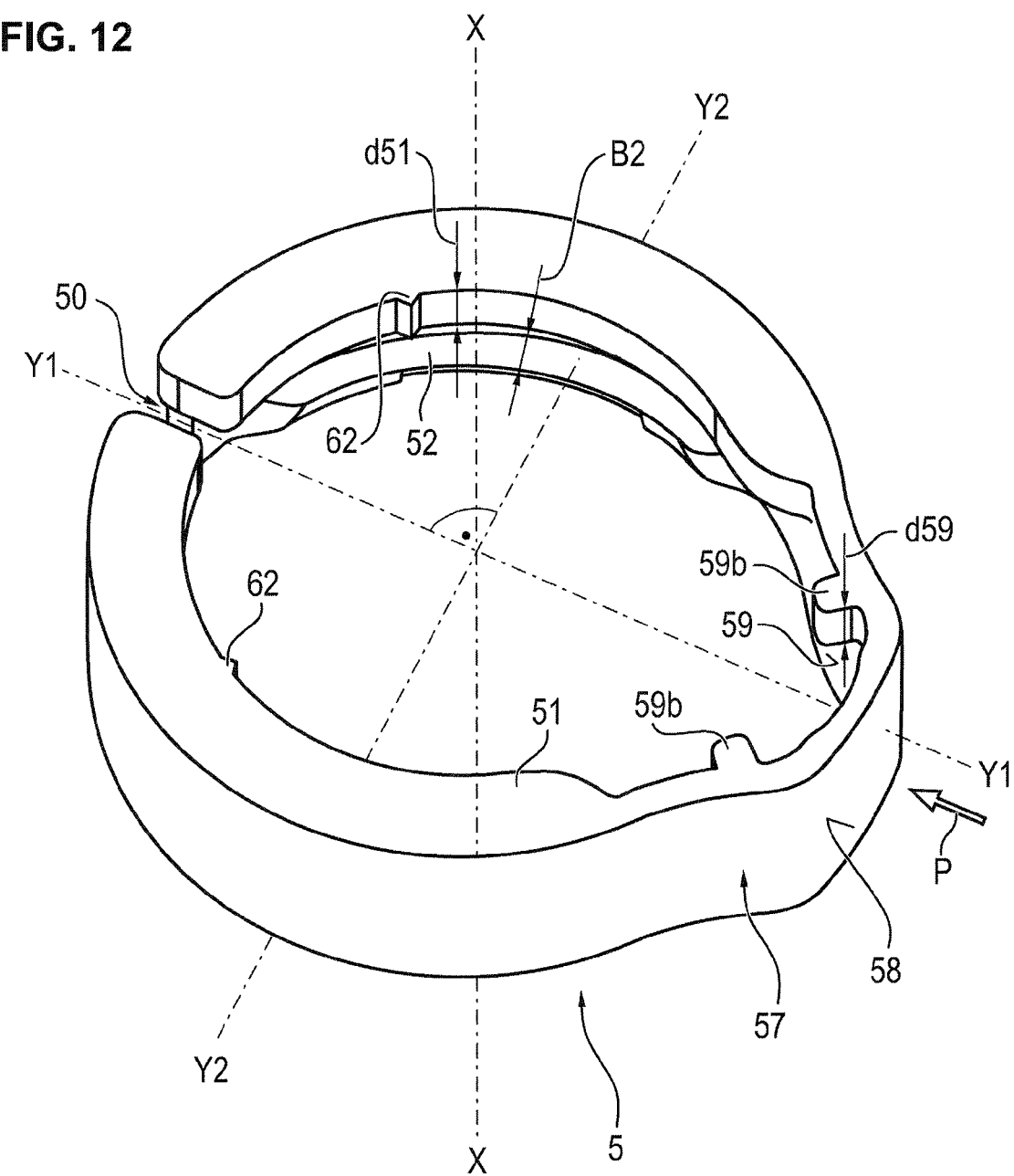
FIG. 12 shows a perspective view of the second embodiment of the retaining part according to the invention seen from above in a representation corresponding to FIG. 6, but enlarged.

The retaining part 5, of which a first embodiment is represented in FIGS. 1 to 10 and a second embodiment is represented in FIGS. 11 and 12, has an open annular contour characterized by a circumferential slot 50, which is not described in detail, and can be axially and radially undetachably assembled on one of the two coupling parts 2, 3 in a preassembled state shown in FIG. 9—in the shown embodiment, on a plug part 3.

The retaining part 5 is basically configured as a single-piece elastic annular retainer clip having the axially and radially continuous slot 50 in a peripheral area as interruption of a closed ring shape for radial elastic deformability, so that two spring-elastic arched locking arms are formed, which have or form the respectively at least one C-shaped retaining section 53. The retaining part 5 can therefore be assembled and disassembled transversely with respect to the insertion axis X-X under elastic expansion.

For the assembly, first a spring-elastic expansion out of the preassembly state can be carried out, the retaining part 5 can then be slipped over the other coupling part 2, which is not preassembled, and a subsequent spring-elastic recovery can then take place. The undetachability of the retaining part 5 is ensured, on the one hand, by means of its only minimally open annular shape, which due to the small slot width of the slot 50 deviates only slightly from a closed ring shape. Because the retaining part 5 encompasses one of the coupling parts 2, 3 at an angle of 360°, that is, almost completely, an additional retaining locking is advantageously not necessary. The width of the slot 50 can be specified herein especially by the slot opening angle β, which is especially smaller than 15°, preferably smaller than 5°, and is not described in detail, which is defined by means of the representations in FIGS. 3 to 5 between the ends of the retaining part 5 located at both sides of the slot 50.

Figure 2:
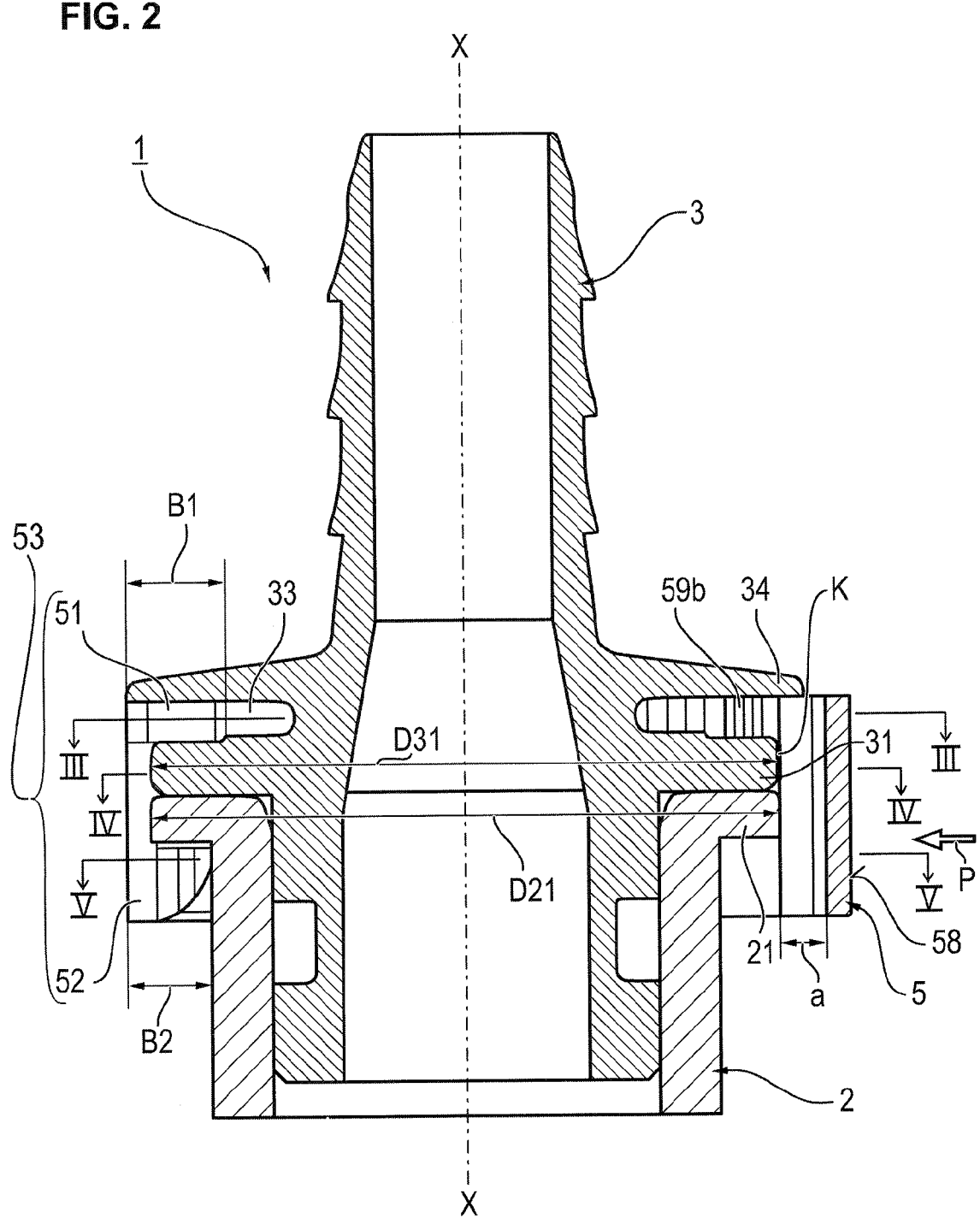
FIG. 2 shows an axial longitudinal section through the first embodiment of a plug connection according to the invention with the first embodiment of a retaining part according to the invention in smaller scale than in FIG. 1.
Figure 5:
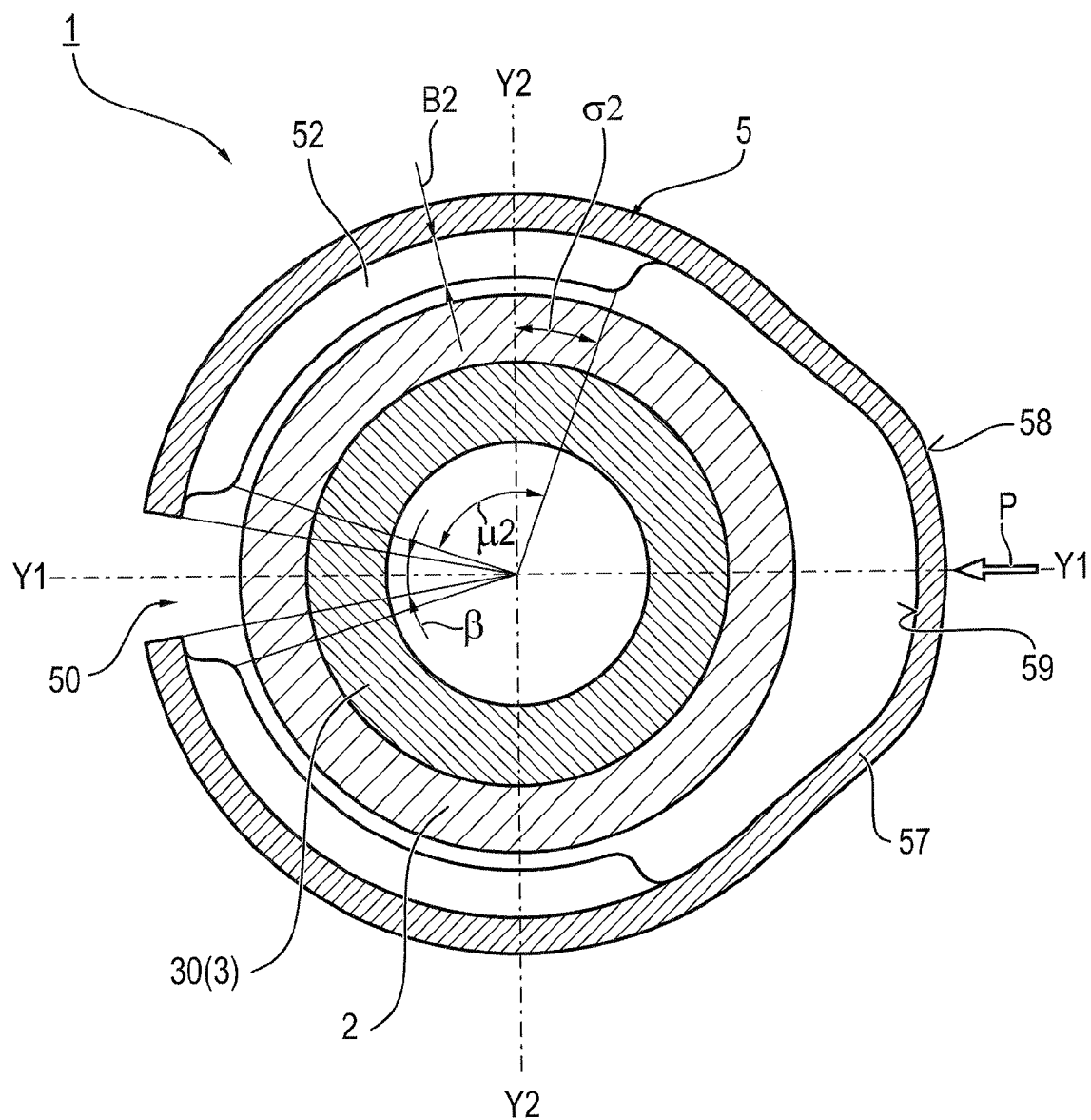
FIG. 5 shows a section through the first embodiment of a plug connection according to the invention with the first realization of a retaining part according to the invention along the line V-V of FIG. 2.
Figure 6:
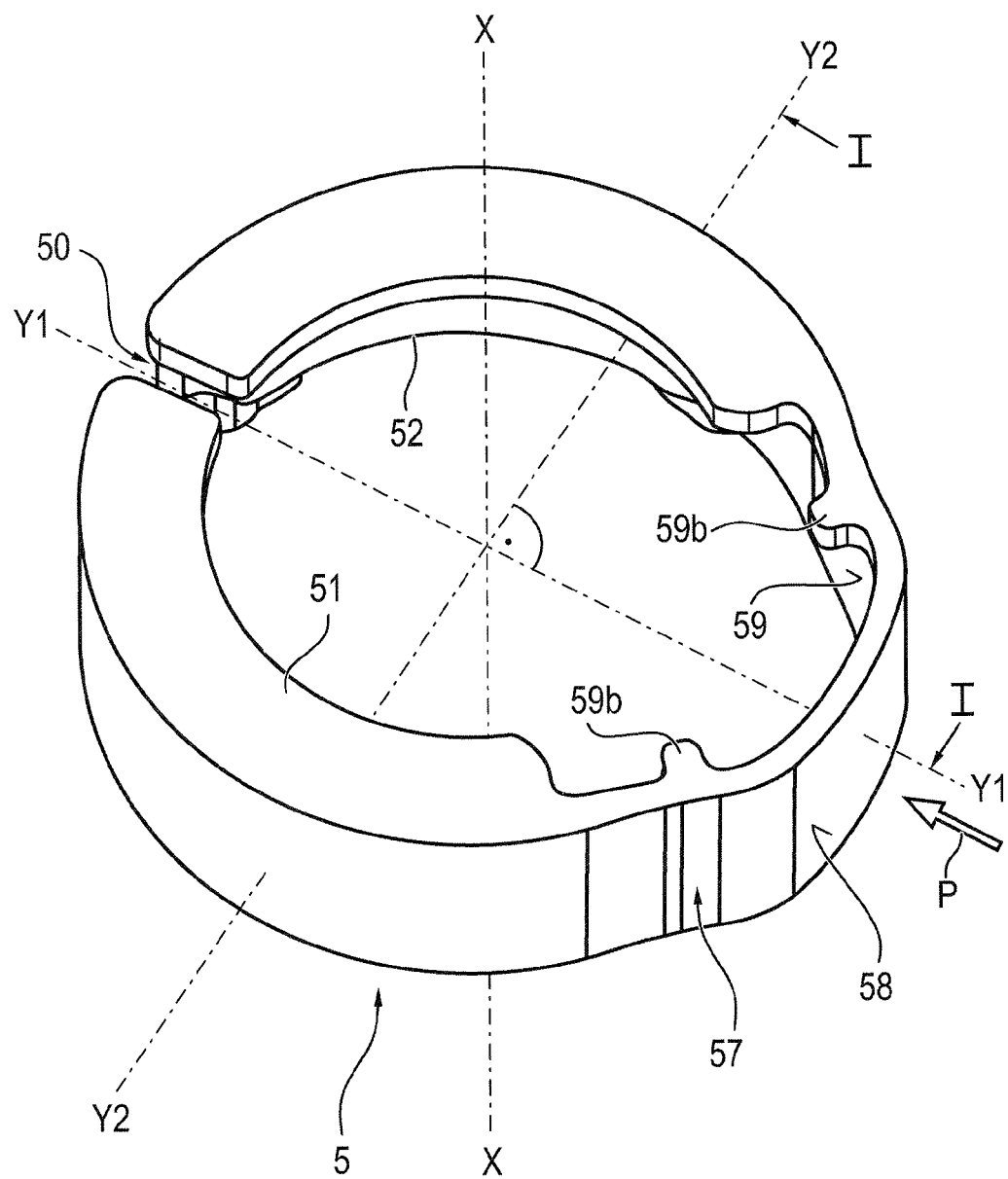
FIG. 6 shows a perspective view of the first embodiment of the retaining part according to the invention seen from above.

From the representations of the retaining part 5, as well as from the single partial representations of the retaining part in FIGS. 6 to 8 and from the representation of the preassembly state shown in FIG. 5, and also from the representation of the assembled state shown in FIGS. 1 and 2, it becomes evident that the retaining part 5 has at least one radially elastically movable retaining section 53 having a C-shaped axial cross section and two collars 51, 52, which after the assembly axially and radially encompass the retaining rib ribs 21, 31 of the two coupling parts 2, 3 in a positively locking manner. Two such retaining sections 53, which are positioned symmetrically with respect to a longitudinal axis Y1-Y1 of the retaining part 5, are preferably provided. The design of the collars 51, 52 of the retaining sections 53, which will be described in the following, also contributes in a defined manner to the undetachability of the retaining part 5. More accurately expressed, the collars 51, 52 are circumferentially running annular collar sections, but will be called "collars" in the following for reasons of simplification.

Figure 3:
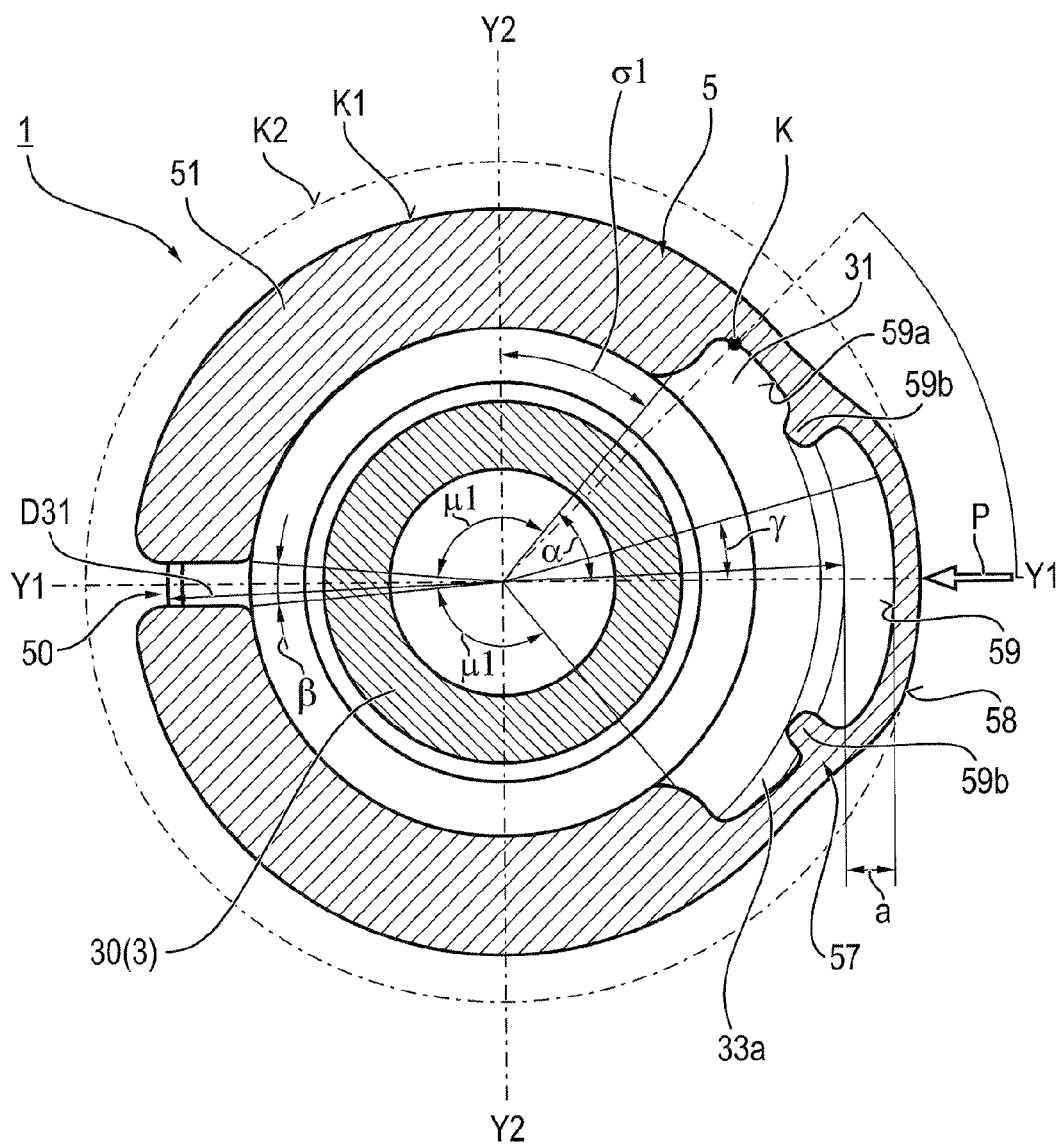
FIG. 3 shows a section through the first realization of a plug connection according to the invention with the first embodiment of a retaining part according to the invention along the line III-III of FIG. 2.
Figure 4:
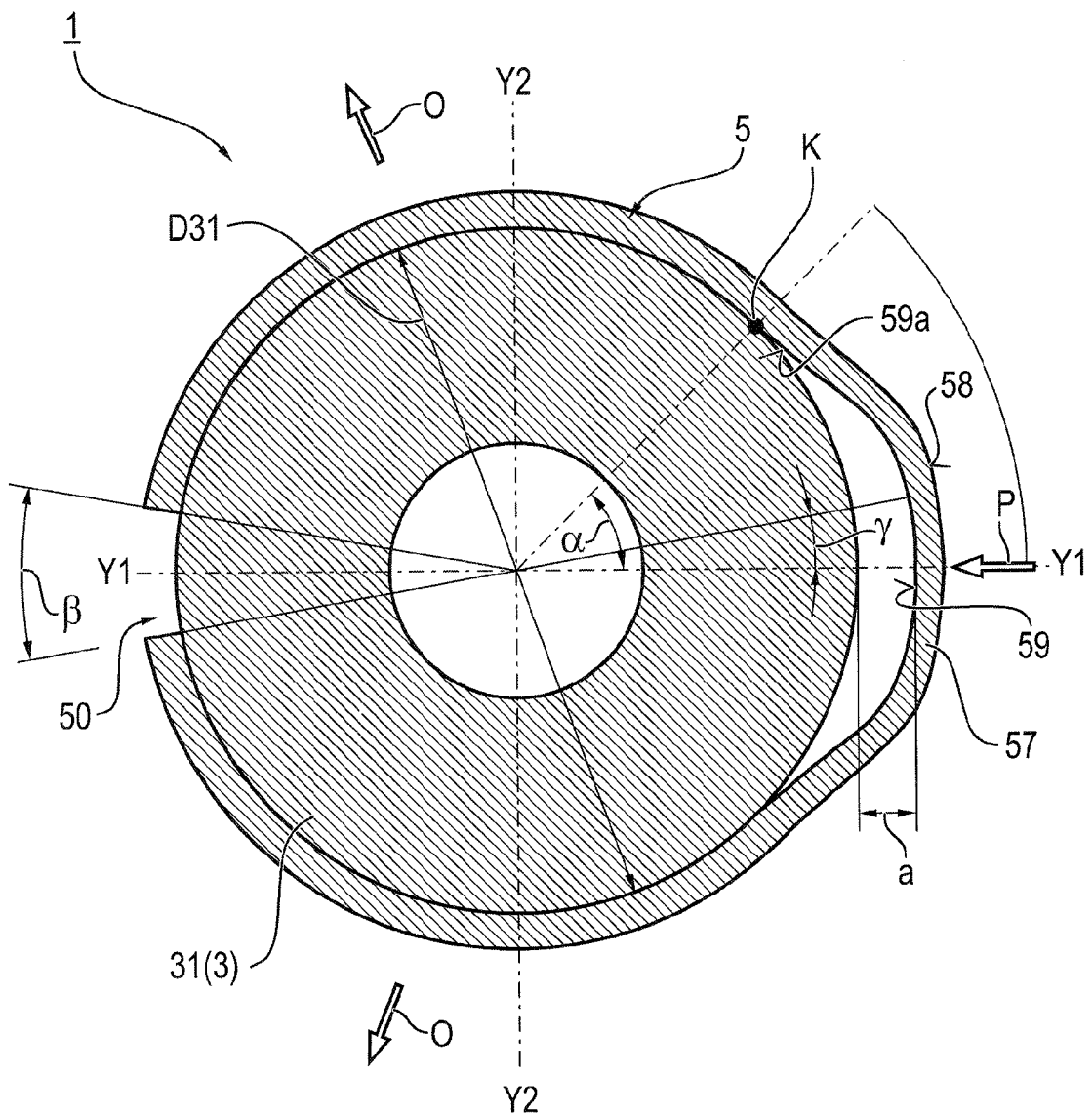
FIG. 4 shows a section through the first design of a plug connection according to the invention with the first embodiment of a retaining part according to the invention along the line IV-IV of FIG. 2.

As becomes apparent from the information regarding the position of the sectional planes in FIG. 2, FIG. 3 shows herein a sectional view through the collar 51 in the upper part of FIGS. 1 and 2, FIG. 4 shows a sectional view between the collars 51, 52 in the area of the retaining rib 31 of the plug part 3, and FIG. 5 shows a sectional view between the collars 51, 52 in the area below the retaining rib 21 of the socket part 2 with plan view on the lower collar 52 of the retaining part 5. An exemplary embodiment of the first upper collar 51 of the retaining section 53 shown in FIGS. 1, 2, 9 and 10 and an exemplary embodiment of the second lower collar 52 are very clearly evident in the upper part of FIG. 7, wherein the upper collar 51 is located below and the lower collar 52 is located above.

In all of the represented embodiments two retaining sections 53 are provided which are symmetrical with reference to a longitudinal axis Y1-Y1 of the retaining part 5 shown in FIGS. 3 to 8 and are respectively provided on a transversal axis Y2-Y2 diametrically opposite to each other, wherein however a greater number of retaining sections could be present also as a result of an optional circumferential segmentation of the retaining sections 53.

The second collar 52 of each retaining section 53 of the retaining part 5 is configured as a locking element with a radial inwardly inclined face 54, which preferably can have a convex configuration and rests on the side facing toward the socket part 2 during the insertion procedure (FIG. 9). If—as shown in FIG. 9—the plug part 3, on which the retaining part 5 is preassembled and which ends in a catch mechanism for assembly, is inserted along the axis X-X in insertion direction S into the receiving opening 20 of the socket part 2, this inclined face 54 serves as a spreading face for the retaining part 5 or more accurately for its second collar 52.

For a preassembly fixation of the retaining part 5, the corresponding coupling part 2, 3, preferably the plug part 3—as shown in FIG. 9—can be provided with an additional annular fixing rib 34 in order to form a peripheral groove 33, which accommodates the corresponding radial collar 51 of the retaining part 5. The latter can preferably have a diameter that is greater than the diameter of the retaining rib 31. The diameter of the retaining rib 31, instead, corresponds preferably approximately to an inner diameter of the retaining section 53 in an interior surface area between the collars 51, 52.

Because the inclined spreading face 54 glides relative to a counter spreading face 22 of the retaining rib 21 acting as counter locking element, a radially outward directed spreading movement of the retaining part 5 transversely to the axis X-X is carried out around a radial spreading path under the action of an assembly force during insertion around a specific axial assembly path. After the end of the spreading path has been reached, the collar 52 engages behind the retaining rib 21 of the socket part 2 in a positively locking way with a radial retaining edge 55, so that a positive lock connection acting in insertion direction S is configured, as is shown in FIGS. 1 and 2. When the coupling parts 2, 3 are intermated, the retaining section 53 is moved radially outward by means of the retaining rib 21 moving relative thereto and lockingly encompasses with a C-shape the retaining rib 21, 31 of the two coupling parts 2, 3 after a subsequent inward radial return movement in inserted state.

In a particularly preferred configuration, a contour of the spreading face 54 facing the counter spreading face 22 can be adapted to a counter contour of the counter spreading face 22 facing the inclined spreading face 54 in such a way that the spreading path changes in a non-linear fashion to at least partially overproportional, proportional and/or subproportional during insertion, depending upon the assembly path, especially within different assembly phases. The maximum applicable assembly force can be reduced in this way, on the one hand, during the insertion, in that the optimized assembly path-assembly force characteristic allows a reduction of the height of the assembly force peaks occurring during insertion. It is possible, on the other hand, to achieve a uniform distribution of the force to be applied for assembly throughout the entire insertion procedure. It is advantageously possible in this regard to shorten the entire assembly path in comparison to a configuration with a planar spreading face 54, which especially leads to advantages from the point of view of minimizing the necessary installation space.

The collars 51, 52 of the respective retaining section 53 can encompass in a positive fitting manner the shaft 30 of the plug part 3, preferably in the area of the peripheral groove 33 of the plug part 3, and the socket part 2 underneath its retaining rib 21, that is, on the side facing away from the plug part 3, preferably in the area of a peripheral groove 23 of the socket part 2, in assembled state as shown in FIG. 1.

In the plug connection 1 according to the invention or the retaining part 5 according to the invention, it is provided that the collars 51, 52 in the retaining section 53 of the retaining part 5 are configured with different size and/or shape in such a way that a collar 52, which abuts against the retaining rib 21 of one coupling part 2 in assembled state, is released with an outward radial elastic movement of the retaining section 53 from the assembled state, while the other collar 51 once more engages at least by sections behind the retaining rib 31 of the other coupling part 3 against which it abuts. This configuration according to the invention is shown in particular in FIG. 10, which especially shows the release of the retaining rib 21 of the socket part 2 by means of the lower second collar 52 and the engagement of the upper first collar 51 in the peripheral groove 33 of the plug part 3.

The lower collar 52 is not shown in the representation, since it is displaced toward the back in direction of the arrow p located in the longitudinal axis Y1-Y1 out of the plane of the transversal axis Y2-Y2 in the peripheral groove 23 of the coupling part via the outer diameter D21 of the retaining rib 21 in the area of the transversal axis Y2-Y2 away from the sectional plane in the perspective representation.

The radial elastic movement of the retaining section 53 from the assembled state toward the outside occurs simultaneously according to the invention, preferably in the presence of at least two retaining sections 53, which are positioned symmetrically with respect to the longitudinal axis Y1-Y1 of the retaining part 5, in whose plane the slot 50 of the retaining part 5 is located. In this case the retaining sections 53 lead to a mutual pliers-like spreading movement, wherein the slot opening angle β between the ends of the retaining part 5 located at both sides of the slot is enlarged.

It can be determined by means of an observation of FIGS. 2, 3, 5 as well as 7 to 9 that the two collars 51, 52—seen in plan view—are preferably configured identical only in some sections and preferably especially not congruent. They can especially have different angles of wrap—each with indeed approximately identical width B1 (FIGS. 2, 7 to 9) and B2 (FIGS. 2, 5, 9) and equal circumferential, in particular arched curvature—for the coupling part located between them and have hence a different circumferential length.

The upper, first collar 51 in this case spans the plug part 3 in the assembled state by a greater angular range µ1 than the angular range µ2, with which the lower, second collar 2 spans the socket part 2. In other words: an angle at center µ1, which is spanned between the start and end of the area of the first collar 51 (FIG. 3), which has a fixing effect, is greater than a corresponding angle µ2 of the second collar 52 (FIG. 5). The angle at center µ1 of the respective upper collars 51 of the retaining sections 53 is so large herein that the collars 51 always extend—that is, after preassembly, after assembly and in particular also during disassembly (FIG. 10) in which the retaining part is in spread state—at least in some areas, into the peripheral groove 33 of the plug part 3. The retaining part 5 according to the invention is axially fixed and retained in this way in the annular groove 33 of the coupling part 3 by means of the collars 51—which in addition engage behind the retaining rib 31 of the plug part 3—against which they abut in assembled state (and also in the preassembled state).

The angle at center µ1, which is spanned between the start and end of the area of the first collar 51 (FIG. 3), which has a fixing effect, can respectively be especially within a range of 115° to 135° herein, whereby a total wrapping of the plug part 3 within a range of 230° to 270° is obtained. The angle at center µ2, which is spanned between the start and end of the area having a fixing effect of the second collar 51 (FIG. 5), in this regard can be in particular within a range of 80° to 110°, whereby a total wrapping of the socket part 2 within the range of 160° to 220° is obtained. The upper collar 51 has thus a greater wrapping angle than the lower collar 52.

An actuation area 57 can be configured, preferably circumferentially, at the transversal sides of the retaining part 5; said actuation area is preferably elastic—at least in some areas—and is located between the collars 51, 52 of the retaining sections 53, in which a radial expansion of the retaining sections 53, which is sufficient to draw a coupling part 2, 3—in this case a socket part 2—out of the plug connection 1, can be produced during disassembly by means of spreading by exerting pressure manually on a pressure-loaded area 58 (pressure arrow p in FIGS. 2 to 8 and 10), advantageously with only one finger. This means that the mutual distance between the lower collars 52, which are mutually opposite to each other with respect to the longitudinal axis Y1-Y1 of the retaining part 5, is enlarged to such an extent that is it greater than the diameter D21 of the retaining rib 21 of the coupling part 2. The mutual distance between the upper collars 51, which are mutually opposite with respect to the longitudinal axis Y1-Y1 of the retaining part 5, is simultaneously enlarged in contrast only to such an extent that it remains smaller than the diameter D31 of the retaining rib 31 of the plug part 3.

The actuation area 57 starts in the represented embodiment—which is shown best by means of FIG. 3—at the circumferential end (angle leg of µ1) of one retaining section 53 and ends at the circumferential end (angle leg of µ1) of the opposite retaining section 53. While the retaining part 5 in the area of the actuation areas 57 has a cylindrical (arched in the shown section) outer contour K1, which is interrupted by the slot 50, the actuation area 57 projects in loop-like fashion from this outer contour K1, wherein the pressure-loaded surface 58 rests on a perimeter K2, which limits the radial overall size of the retaining part 5 according to the invention.

An inner wall area 59 of the retaining part 5 which is located opposite to the pressure-loaded surface 58 in the actuation area 57, can preferably form herein a stop, wherein said stop comes to rest on the coupling part 3, in particular on its shaft 30, more specifically on the retaining rib 31 of the shaft 30, at the end of the disassembly procedure when it is moved by one actuating path a (FIGS. 2 to 4) in direction of the longitudinal axis Y1-Y1 of the retaining part 5. A force deflection, which appears from the start of the disassembly in a border section 59a of the inner wall area 59 at a contact line K—refer to FIG. 2 as well as FIGS. 3 and 4, represented in the latter as point K—between the actuation area 57 and the retaining rib 31 of the shaft 30, is decisive herein in order to convert the manual actuating pressure force p (pressure arrow p in FIGS. 3 to 8, 11 and 12) exerted on the pressure-loaded surface 58 into the spreading movement of the retaining sections 53. This contact line K represents the particular pivot axis during the spreading movement of the retaining sections 53. The circumferential position of the contact line K can be defined in this way by means of an angle α, which is spanned between a radial beam leading to the contact line K and the longitudinal axis Y1-Y1.

The pressure exerted on the actuation area 57 against the retaining rib 31 leads, on the one hand, to the spreading of the retaining sections 53 in direction of the arrows O represented in FIG. 4. Simultaneous with the spreading of the retaining sections 53, on the other hand, a radially inward displacement of the retaining part 5 occurs along its longitudinal axis Y1-Y1 under the effect of the pressure force p, whereupon the actuation area 57 is elastically deformed. It is advantageous herein for the purpose of a uniform opening or spreading movement if the angle α, under which the contact line K is positioned with respect to the longitudinal axis Y1-Y1 of the retaining part 5, remains approximately constant, wherein the angle α can be optimally within a range of 40° and 50°, preferably at 45°. The inner wall area glides in this way as it is deformed over the retaining rib 31 until the actuating path 'a' has been covered. Once this has taken place, the inner wall area 59 can be located on the contact line K in a position that is characterized by a terminal angle of disassembly identified in FIGS. 3 and 4 with the reference character λ, which can preferably be within the range of 10° to 20°, preferably at 15°. During disassembly, the retaining part 5 thus rolls off as it is deformed, preferably over a peripheral angle α-λ of approximately 25° to 35°, preferably 30°, at the contact line K.

The border section 59a of the inner wall area 59, which glides over the contact line K as a consequence of the displacement movement of the retaining part 5 during the spreading of the retaining sections 53, can advantageously be adapted thereto by means of its contour configuration. It thus rolls off over the contact line.

The radial inward displacement of the retaining part 5 is continued—as already mentioned—until the mutual distance on the transversal axis Y2-Y2 between the mutually opposite lower collars 52 with reference to the longitudinal axis Y1-Y1 of the retaining part 5 is greater than the diameter D21 of the retaining rib 21 of the socket part 2, as is shown in FIG. 10. The socket part 2 can then be removed from the plug part 3 and can be drawn in axial direction out of the plug connection 1 in axial direction X-X. The retaining part 5 is held on the plug part 3 because the mutual distance on the transversal axis Y2-Y2 between the mutually opposite upper collars 51 with reference to the longitudinal axis Y1-Y1 of the retaining part 5 is, however, always smaller than the diameter D31 of the retaining rib 31 of the plug part 3.

An angular difference σ1−σ2 (FIG. 3, FIG. 5) between the respective ends of the upper collar 51 and the lower collar 52 facing toward the actuation section 57 plays also a role herein. This angular difference σ1−σ2 should optimally be within the range between 15° and 40°. It can be calculated herein by subtracting the angle σ2, which is the angle spanned between the end of the area of the second collar 52 with fixing action facing toward the actuation section 57 and the transversal axis Y2-Y2 (FIG. 5) from the angle σ1, which is the angle spanned between the end of the area of the first collar 51 with fixing action facing toward the actuation section 57 and the transversal axis Y2-Y2 (FIG. 3). The angle σ1 herein is part of the angle at center μ1, and the angle σ2 is part of the angle at center μ2.

After the applied pressure force load p is discontinued, the retaining 5 easily reaches a position at which it was before deformation as a result of a spring-elastic return of its retaining sections 53. The preassembly state is again attained inasmuch as the socket part 2 was removed.

Concerning the preassembly fixation of the retaining part 5 (FIG. 9) it should additionally be remarked that the latter is carried out after an axial insertion of the single-piece retaining part 5 into the plug part 3 by means of a positive and nonpositive radial locking of its retaining areas sections 53 on the coupling part 3, wherein the retaining part 5 is maximally spread apart in the area of its retaining areas sections 53. The width angle of the retaining sections 53 for the plug part 3 obtained as double the value of the angle at center μ1 represented in FIG. 3 is present after preassembly.

In an advantageous embodiment of the invention, which is depicted in particular by means of FIGS. 1 to 3 as well as 6 to 8, radially inwardly facing guiding and stabilizing lugs 59a are provided which emerge from the interior of the wall areas 59 in the area of the actuation area 57 of the retaining part 5. These guiding and stabilizing lugs 59b are preferably within the plane of the upper collars 51 and glide also during disassembly in the respective peripheral groove 33 in order to accommodate the upper collars 51 which are located between the retaining rib 31 and the annular fixing rib 34 of the plug part 3. The guiding and stabilizing lugs 59b perform the function of ensuring that the retaining part 5 is not displaced in axial direction X-X of the plug connection 1 during disassembly. It can be preferably provided herein that the peripheral groove 33 has a stepped width, that is, that it is narrower starting at its radial inner groove base than in its radial outer area, in order to accommodate the upper collars 51, which serve to accommodate the guiding and stabilizing lugs 59b. This stepping of the peripheral groove prevents the guiding and stabilizing lugs 59b from being pushed in too deeply into the peripheral groove 33 during disassembly. The different groove widths, which are not identified with reference characters in the drawing, correspond accordingly to different thicknesses d51, d59 of the upper collars 51 and of the guiding and stabilizing lugs 59b. The collars 51 herein have a lesser thickness d51 than the thickness d59 of the guiding and stabilizing lugs 59b (refer regarding this to FIG. 8). The stepping of the peripheral groove 33 is indicated in FIG. 3 by means of the reference character 33a.

The second embodiment differs from the first in the technical features described in the following with reference to FIGS. 11 and 12. These features fulfill the general object of further improving the plug connection 1 according to the invention to prevent collisions with other circumjacent components during assembly within narrow installation spaces.

For this purpose, it is provided that the retaining part 5 interacts in such a way with the coupling part 2, 3 via the fixing means 6 in the state where it is seated on the coupling part 2, 3 that the retaining part 5 can be selectively aligned in different relative rotational positions and is respectively fixed against free unrestricted twisting around the plug axis X-X relative to the coupling part 2, 3. The corresponding conditions at the plug part 3 are represented herein, so that the latter will therefore be exclusively described in the following, but only as an example of the two coupling parts 2, 3. Due to this configuration, during or before the insertion procedure of the plug part 3, the retaining part 5, which is seated in preassembled state on said plug part can be advantageously adjusted in the direction of rotation (double arrow T in FIG. 11) such that it can be placed freely and without collisions during insertion in the installation area. The retaining part 5 can no longer be freely twisted also during subsequent operation, but in any case only over a limited angle of rotation, so that collisions with circumjacent components can also then prevented.

Basically this can be a positive fixation of the retaining part 5 relative to the coupling part 3 in direction of rotation T. In the represented preferred embodiment, the retaining part 5 is fixed, however, in such a way in a positive and nonpositive manner via the fixing means 6 in the direction of rotation T that it can be twisted with stepped locking relative to the coupling part 3 and can be adjusted in the different positions of rotation.

For this purpose, the fixing means 6 are formed, on the one hand, by a circumferential snap contour 61 of the coupling part 3 and, on the other hand, by at least one snap mechanism 62 of the retaining part 5, which interacts with a snap contour 61 configured with a peripheral profile that deviates from the circular shape in the manner of a cam track. As is evident from the exemplary embodiment according to FIGS. 11 and 12, the fixing means 6 or the snap contour 61 can be designed for a stepped locking in at least six different rotational positions, in particular with a subdivision of the regular angle of rotation, in interaction with the/each snap mechanism 62. In the represented embodiment, the star-shaped snap contour 61 configured, for example, with eight locking steps, interacts with at least two snap mechanisms 62 of the retaining part 5, wherein the snap mechanisms 62 are arranged asymmetrically offset with respect to the snap contour 61 in such a way that they each interact individually in the different rotational positions of the retaining part 5 with a locking step of the snap contour 61. A multiplication—here a doubling—of the number of possible locking rotational positions in comparison to the number of locking steps of the snap contour 61 can be achieved by means of this embodiment.

It should be noted that the term "locking position" of the retaining part 5 used herein is not necessarily to be understood as an exactly defined angular position, but if applicable as a restricted rotational movement range. The retaining part 5 can thus be twisted on the coupling part 3 over a rotational angle range defined between two locked positions and delimited in this way of, for example, up to 45° or, for example, 22.5°, respectively.

In the embodiment of the plug connection 1 according to the invention, which is represented in FIGS. 11 and 12, the snap contour 61 is formed inside the annular grove 33—according to the sectional plane III-III of FIG. 2—between the retaining rib 31 and the annular fixing rib 34, and namely by means of a corresponding profiling in the base area of the annular groove 33. The/each snap mechanism 62 is provided for this reason in the interior of the respective upper collar 51 of the retaining part 5 in a radially inwardly projecting arrangement.

In an embodiment variation that is not represented in the drawings, the snap contour 61 can also be provided on the outer periphery of the retaining rib 31 or in the area of the peripheral groove 23 of the socket part 2, wherein the retaining part 5 is then provided with the snap mechanism or mechanisms 62 in an inner periphery or on the lower collar 52.

As is already evident from the previous embodiments, the invention is not limited to the represented and described exemplary embodiments, but comprises also all of the embodiments that have a similar action in the sense of the invention. In a deviation from the represented and described embodiments, in which the retaining part 5 is preassembled on the plug part 3 and subsequently coaxially encompasses the plug shaft 30, it is understood that also a corresponding preassembly of the retaining part 5 on the socket part 2 is provided. A preassembled component consisting of a retaining part 5 configured according to the invention and a coupling part 2, 3, as is described for the plug connection 1 according to the invention, is likewise assigned an independent inventive importance.

It should be noted at this point that it is also possible to configure the inclined face corresponding to a spreading face 54 in kinematic reversal on the retaining rib 22 of the socket part 2 in order to achieve the described insertion force optimization during the spreading of the retaining part 5.

A particular advantage of the invention consists in that—as already mentioned—the overall radial size of the retaining part 5 can be configured optimally small. In this way, the pressure-loaded surface 58 can rest on a perimeter K2 with a diameter of 32 mm with an outer contour K1, which is characterized by a circular shape with the diameter of 28 mm, wherein the actuating path for disassembly amounts only to about 2 mm. Expressed in more general terms, this means that the difference between the perimeter K2 and contour K1—with reference to the value of K1—can be smaller than 15 percent and can be practically only at about 12 percent. In this case the actuation path 'a' can be smaller—with reference to the contour K1—than 10 percent and can be in particular at about 5 percent.

The coupling parts 2, 3 can furthermore have any desired connecting elements on their side that is opposite to the plug connection side. In the represented embodiment, the plug part 3 has a connecting pin 35 for a fluid line (pipe or tube). The socket part 2 does not have a specific configuration, but can have, for example, a threaded bushing, wherein however also at least one of the coupling parts 2, 3, such as preferably the socket part 2, can also be directly configured (as one piece) on specific assemblies.

While the above description constitutes the preferred embodiment of the present invention, it will be appreciated that the invention is susceptible to modification, variation, and change without departing from the proper scope and fair meaning of the accompanying claims.

The invention claimed is:

1. A plug connection for fluid lines, comprising two intermateable first and second coupling parts, which in an assembled state are releasably locked together, a first outer radial flange retaining rib formed by the first coupling part, and a second outer radial flange retaining rib formed by the second coupling part, which retaining ribs are in contact with each other in an insertion direction (S) and axially (X-X) in the assembled state, a retaining part with an annular contour, which in a preassembled state is axially and radially fixed and retainingly assembled on one of the first and second coupling parts and in the assembled state axially and radially encompasses the first and second retaining ribs of the coupling parts with at least one radially elastically moving retaining section with a C-shaped axial section having first and second collars, the first and second collars of the retaining part being configured with different sizes or shapes in such a way that the first collar, which abuts against the first retaining rib releases the first retaining rib of the first coupling part with an outward radial elastic movement of the retaining section from the assembled state, while the second collar still engages at least in some areas behind the second retaining rib of the second coupling part against which it abuts, the retaining part being a single-piece elastic ring having a peripheral contour interrupted by a slot, the retaining part further including an elastic actuation area located circumferentially between the collars, on a transversal side of the retaining part diametrically opposite to the slot, the retaining part being configured to effectuate radial expansion of the collars during disassembly by means of a spreading (O) as a result of a pressure force (p) on a pressure-loaded surface of the actuation area, respectively in direction of a longitudinal axis (Y1-Y1) of the retaining part, and the actuation area further defining a stop configured to abut against the second coupling part after traversing an actuation path (a) and to restrict further outward spreading movement of the retaining section.

2. The plug connection of claim 1, wherein the retaining part includes two retaining sections, which are C-shaped in axial section and are distributed in radial symmetrically over the periphery of the ring, and are located on the longitudinal sides of the ring.

3. The plug connection of claim 2 further comprising in that a slot opening angle (R) between the ends of the retaining part located on both sides of the slot is smaller than 15°.

4. The plug connection of claim 1 further comprising in that the first collar of the retaining part is configured as a snap element having a radial inner inclined face configured as a first spreading face on the side facing toward the first coupling part during an insertion procedure, which produces a radially outward directed spreading movement of the retaining part as a result of the first retaining rib of the first coupling part, which moves relative thereto during the insertion procedure, wherein the first collar in a biased engagement behind the first retaining rib after a locking with the first coupling part moving a radial retaining edge.

5. The plug connection of claim 4, further comprising in that the inclined face causes a spreading movement of the retaining part transversely to the axis (X-X) by one spreading path as it glides by one assembly path relative to a second spreading face of the first retaining rib under the effect of an assembly force during the insertion procedure, wherein a contour of the inclined face facing toward the second spreading face is adjusted in such a way to a counter contour of the second spreading face facing toward the inclined face that the spreading path changes non-linearly during insertion in dependence upon the assembly path.

6. The plug connection of claim 1 wherein the first and second collars of the retaining section in the assembled state encompass in a positive fitting manner a shaft of the second coupling part in a peripheral groove of the second coupling part, and encompass in a positive fitting manner a socket part of the first coupling part in a peripheral groove of the first coupling part.

7. The plug connection of claim 1 further comprising in that the first and second collars differ in size or shape and in that the second collar in the assembled state encompasses the second coupling part over an angle centered at a longitudinal axis of the plug connection that is greater than an angle by which the first collar encompasses the first coupling part.

8. The plug connection of claim 7, wherein the angle of the second collar is within a range of 115° to 135°.

9. The plug connection of claim 8, wherein the angle of the first collar is within a range of 80° to 110°.

10. The plug connection of claim 1 further comprising in that the first collar and the second collar have the same width (B1, B2) and curvature.

11. The plug connection of claim 1 further comprising in that a circumferential annular groove, in which the second collar of the retaining part is held in during disassembly, is formed axially between the second retaining rib and an additional annular fixing rib in the second coupling part.

12. The plug connection of claim 1, further comprising in that the conversion of the pressure force (p) exerted on the pressure-loaded surface into a spreading movement of the retaining sections carried out at a contact line (K) located in a border section of an inner wall area of an actuation area causes a force deflection, wherein the contact line (K) represents a pivot axis during the spreading movement of the retaining sections.

13. The plug connection of claim 12, further comprising in that a circumferential position of the contact line (K) is defined by means of an angle (a), which is spanned between a radial beam leading to the contact line (K) and a longitudinal axis (Y1-Y1) of the retaining part, and is within a range of 40° and 50°.

14. The plug connection of claim 1 further comprising in that the retaining part and one of the first and second coupling parts, when the retaining part is seated on the one coupling part, are configured to be selectively adjusted in different relative rotational positions and fixed respectively against a free unrestricted twisting of the retaining part around the insertion axis (X-X) relative to the one coupling part.

15. The plug connection of claim 14, further comprising in that the retaining part is fixed in such a way in a positive and nonpositive manner in a direction of rotation (T) via a projection on one of the retaining part and the one coupling part and a contour on the other of the retaining part and the one coupling part, that the retaining part is twistable relative to the one coupling part with a stepped locking and adjustable in the different rotational positions.

16. The plug connection of claim 15, further comprising in that the contour is formed by a circumferential snap contour of the one coupling part in the form of a plug part, and the projection is at least one snap mechanism of the retaining part that interacts with the snap contour.

17. The plug connection of claim 1 further comprising in that radially inwardly directed guiding and stabilizing lugs, which glide in a peripheral groove during disassembly in order to accommodate the second collars and prevent a displacement of the retaining part in an axial direction (X-X), are arranged on the retaining part in an actuation area thereof.

* * * * *